April 14, 1970 C. E. GIANGIULIO 3,505,731
CORING DEVICE
Filed Jan. 8, 1968 2 Sheets-Sheet 1
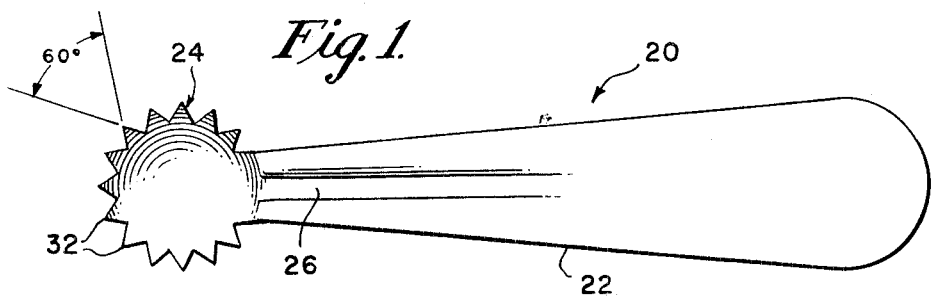
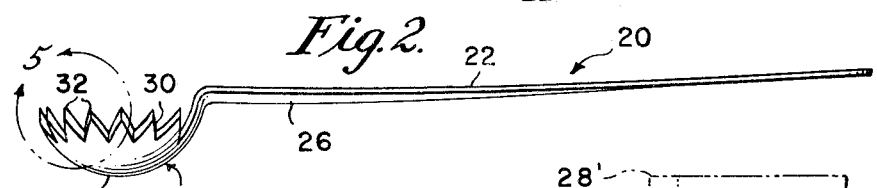
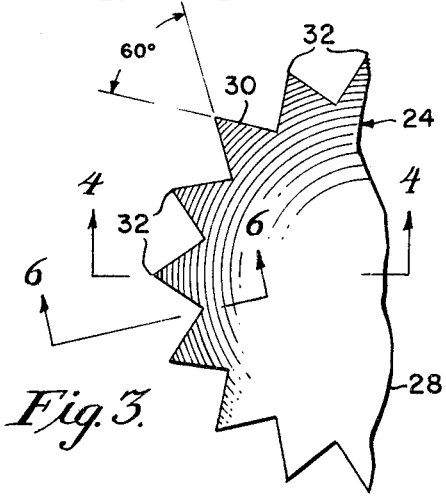
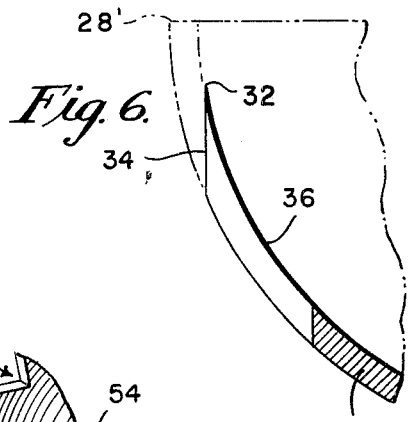
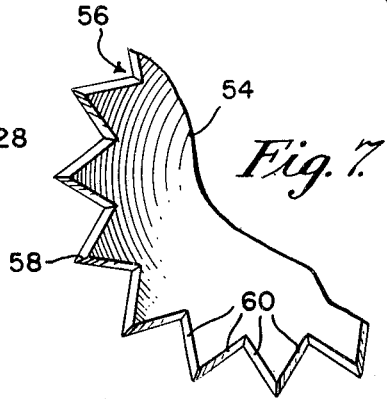
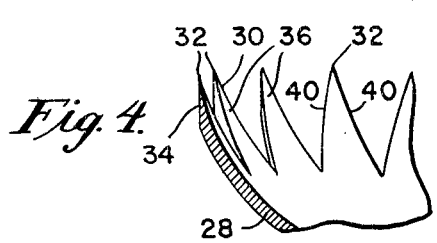
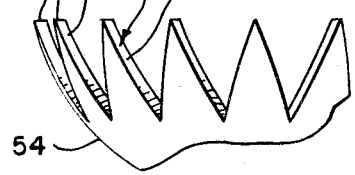
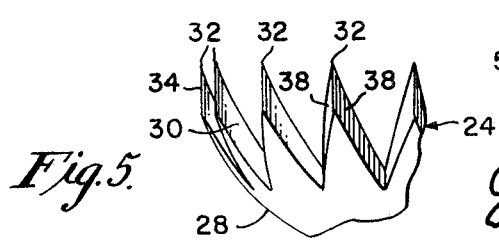
INVENTOR.
CLAYTON E. GIANGIULIO
BY
Caesar, Rivise,
Bernstein & Cohen
ATTORNEYS.

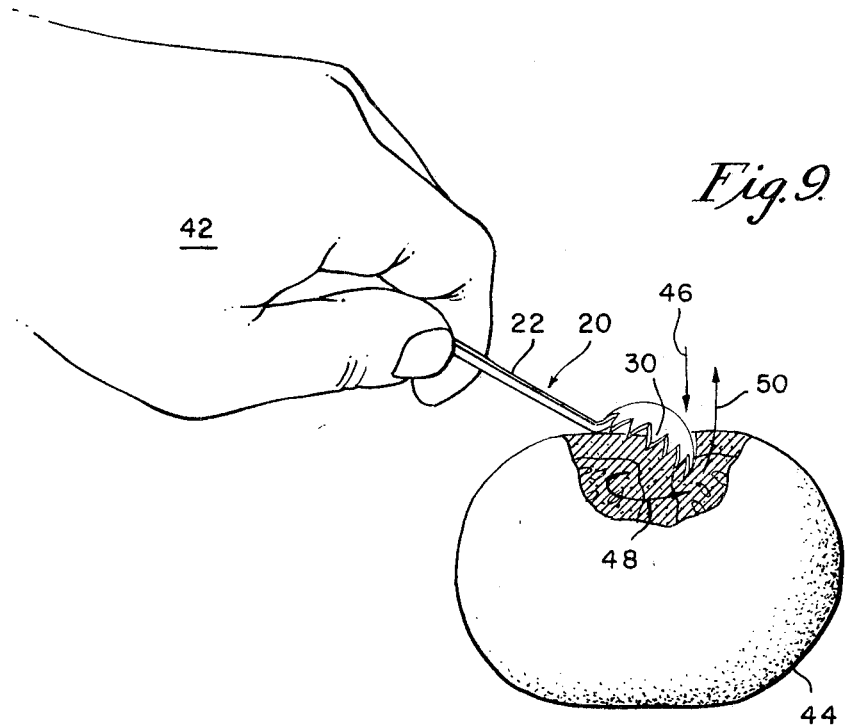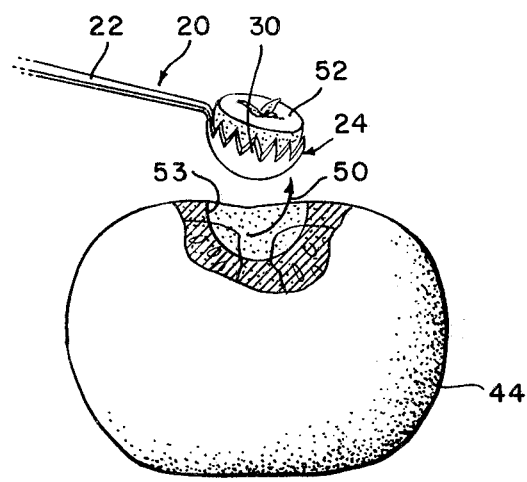

United States Patent Office

3,505,731
Patented Apr. 14, 1970

3,505,731
CORING DEVICE
Clayton E. Giangiulio, Forest Lane and Skyline Road,
Malvern, Pa. 19355
Filed Jan. 8, 1968, Ser. No. 696,389
Int. Cl. A47j 25/00
U.S. Cl. 30—25            5 Claims

ABSTRACT OF THE DISCLOSURE

A coring device comprising a handle having a concave cutting member at one end thereof. The cutting member includes a plurality of spaced teeth, with each tooth terminating in a point and having at least one cutting edge formed thereon.

---

This invention relates to a coring device, and more particularly, to a device which can be held in the hand of a user and can easily remove the core of a tomato.

The common practice for removing the core of a tomato is to take a coring knife, insert it into the tomato at the stem end, rotate the knife around the core, and remove the core, As used herein, the core of the tomato refers to the hardened stem end of the tomato. Using the coring knife, it is difficult to obtain a uniform penetration into the tomato, and usually the core which is removed is irregular in shape. Furthermore, the coring knife will usually remove a great deal more of the body or flesh of the tomato than is desired because of the difficulty in controlling the penetration of the coring knife.

Another problem of using a core knife is that it is inefficient from the standpoint of time when a great number of tomatoes have to be cored and sliced. This problem is particularly true in restaurants and in other institutions serving large volumes of food. Therefore, in an effect to save time, restaurant chefs will slice the top section of a tomato off rather than go through the more time-consuming process of coring the tomato. This has two disadvantages. The first is that a great deal of edible portion of the tomato will be cut off by slicing off the top or stem end. Secondly, because of the problem of removing the edible portion of the tomato, the top slice is never made to any extensive depth into the tomato, and therefore a substantial portion of the core will remain. This remaining portion will be in the first slice of the tomato, and will therefore present an undesirable hardened portion of the tomato when the tomato is being consumed.

Hand-held devices have been developed for use on peeling citrus fruits. These devices have a hollow, hemispherical end with a plurality of downwardly projecting teeth. In use, this device will be placed at one end of a piece of citrus fruit, such as an orange, and pushed downwardly, thereby forcing the teeth into the skin of the citrus fruit. Thereafter, the device is rotated and the sides of the teeth will cut the citrus skin and the skin can be removed. This permits the peeling of the remainder of the citrus fruit.

Although the citrus peeling device is effective for use on citrus fruit, it cannot be used for coring tomatoes or other soft commodities. The reason for this is that the teeth of the citrus peeling devices have flat surfaces with very little inherent cutting ability. The reason that these devices can readily cut citrus skins is that the skins are relatively hard and the citrus peeling devices are made from a thin gauge metal, which readily penetrates the skin. However, these same teeth on the citrus peeling devices will fray the skin of a tomato and will tend to compress or squeeze the tomato because of the difficulty in penetrating the skin of the tomato. Additionally, if the citrus peeling device is used in an attempt to core the tomato, the skin of the tomato will not be cut, but will be left in a frayed hanging condition even though the core may be removed.

All of the problems of the prior art devices are overcome by the device of this invention. The device of this invention is easier to use than a coring knife for removing the cores of various commodities. It can be used in far less time than the time required for using a coring knife. It possesses the additional advantage of always removing a predetermined amount of core without the removal of the desirable edible flesh of the tomato.

Insofar as the citrus peeling devices are concerned, it has been found that they cannot effectively be used on coring tomatoes. One of their shortcomings is that it is difficult to pierce the tomatoes with them because there are no sharply defined piercing points. Likewise, they cannot be rotated in tomatoes in a manner which will cut and remove the skin adjacent the core because there are no cutting edges on the citrus fruit peelers.

It is therefore an object of this invention to provide a coring device which is especially adapted for coring soft commodities, such as tomatoes.

It is another object of this invention to provide a coring device having sharp piercing teeth and cutting edges for piercing a commodity and cutting the commodity to remove an undesired portion.

These and other objects of this invention are accomplished by providing a coring device comprising a handle having a cutting member at one end thereof, said cutting member including a plurality of spaced teeth, each of said teeth terminating in a point, and each of said teeth having at least one cutting edge formed thereon.

Other objects and many of the attendant advantages of this invention will be readily appreciated as the same becomes better understood by reference to the following detailed description when considered in connection with the accompanying drawings wherein:

FIG. 1 is a top plan view of the coring device of this invention;

FIG. 2 is a side elevational view of the coring device of FIG. 1;

FIG. 3 is an enlarged fragmentary top plan view plan of the coring end of the device of this invention;

FIG. 4 is a sectional view taken along the line 4—4 of FIG. 3;

FIG. 5 is an enlarged side elevational view of area 5 designated in FIG. 2;

FIG. 6 is an enlarged sectional view taken along the line 6—6 of FIG. 3;

FIG. 7 is a partial top plan view of the citrus fruit peeling device of the prior art;

FIG. 8 is a partial side elevational view of the device of FIG. 7;

FIG. 9 is a perspective view, partly in section, showing the method of using the coring device of this invention in coring a tomato; and FIG. 10 is a perspective view, partly in section, showing the final step in removing a core from a tomato with the device of this invention.

Referring now in greater detail to the various figures of the drawings wherein similar reference characters refer to similar parts, a coring device embodying the present invention is generally shown at 20 in FIG. 1. Device 20 basically comprises a handle 22 having a cutting member 24 at one end thereof.

The handle and cutting member are unitary with each other. Handle 22 is elongated, as best seen in FIG. 1, and includes a reinforcing rib 26 adjacent cutting member 24. Cutting member 24 includes a concave dome 28 having a plurality of equally spaced teeth 30 projecting from one edge thereof. As best seen in FIGS. 4 and 5, each tooth 30 terminates in a point 32. As seen in FIG. 5, the outer edge of the tooth terminating in the point is vertical, as indicated at 34. As seen at 36 in FIG. 4, the inner edge of the tooth terminating in point 32 is arcuate and has the same radius of curvature as the dome 28. The outer surface of each tooth is formed with a pair of bevels 38 which terminate in cutting edges 40.

The angle of each tooth 30 can be varied while still obtaining the desired results. However, in a preferred embodiment, the angle of each tooth is 60°, as indicated in FIG. 3. It has been found that the 60° angle gives the desired penetration into a tomato, and also permits the obtaining of sufficiently sharp edges to facilitate the cutting and final coring of the tomato. It should be noted that FIG. 3 is a top plan view of the cutting member of this invention and in this view, the concave dome 28 is lowermost. Because the teeth 30 terminate in points 32 which have vertical rear edges 34, only the points are visible in the top plan view. As will be explained hereinafter, this is in sharp contrast to the prior art citrus peeling devices which have elongated top edges for each of the teeth.

The use of the device of this invention is seen in FIGS. 9 and 10. In FIG. 9, it is seen that the handle 22 is placed in a hand 42 and held at an angle to a tomato 44. The forwardmost teeth 30 are pushed into the tomato adjacent the core, and in the direction of arrow 46. Because of points 32 on the teeth, penetration into the tomato is easily carried out.

After penetration has been made, device 20 is rotated in the direction of arrow 48 until the entire surface of the tomato around the core has been cut. The bevelled surfaces 38 terminating in cutting edges 40 permit the rapid rotation of the cutting device in the tomato, regardless of how soft the tomato is. Furthermore, since cutting edges 40 are present on both sides of teeth 30, the coring device can be rotated either clockwise or counterclockwise.

After a complete cut has been made, the coring device 20 is inverted and lifted upwardly in the direction of arrow 50. As seen in FIG. 10, this permits the removal of the core 52 of the tomato. As further seen in FIG. 10, the coring device will smoothly cut the core and leave a distinct semi-spherical hole 53 in the tomato. As seen in FIG. 2, handle 55 lies in a plane which is vertically spaced from the points 32 of teeth 30, and in a direction away from dome 28. This facilitates the inversion of the coring device 20 in the tomato in order to remove the core 52. Thus, during the inversion, the handle 22 will not enter the tomato and the entire removal of the core is accomplished by the dome and the teeth of the coring device, thereby leaving the semi-spherical hole 53 in the tomato. The fact that a fine removal of the core is accomplished can be very important in the commercial utilization of tomatoes. Thus, there will be no unsightly rough edges in the tomato when it is ultimately sliced or quartered for service to a restaurant customer, as could be the case had the core been removed with a coring knife. In addition, the coring device of this invention can be used much more quickly and easily than a coring knife.

The device of this invention can be made from any rigid moldable or formable material. A preferred material is stainless steel since this material will retain its sharp edges and point for extended periods of time and can be continually washed in commercial dish washing equipment without fear of rusting. However, other materials generally used for utensils can be used in making the device of this invention. For instance, chrome plated steel can also be used. The device can also be made in relatively inexpensive materials such as rigid plastics.

The device, when made from stainless steel, which is the preferred material, is formed from a flat sheet of the steel. In the first step of the forming process, the flat sheet is stamped in order to form the rib 26 and the dome 28. In the second and final step of the operation, the shape of the handle 22 is finalized by cutting off the excess metal and the bevels 38 and points 32 are formed in the teeth 30.

In order to form the bevels on the teeth the second step is accomplished by using a pair of stamping dies. The female portion of the die will do the actual cutting of the teeth 30. Thus, as seen in FIG. 6, the original shape of dome 28 is shown in phantom at 28′. When the female portion of the dye is moved vertically against the dome 28, the portion of the dome shown in phantom in FIG. 6 is removed. At the same time, the bevels 38 are cut leaving cutting edges 40 and the vertical edge 34 is formed.

The prior art citrus peeling devices are partially shown in FIGS. 7 and 8. These devices include a domed head 54 having a plurality of teeth 56. Each of the teeth terminates in an upper edge 58. Contrasted with this, the teeth of the device of this invention terminate in a point 32. Each of the teeth 56 of the citrus peeling devices terminates in flat surfaces 60. Contrasted with this, the teeth of the device of this invention terminate in bevelled surfaces 38, which in turn terminate in cutting edges 40.

The structural differences pointed out above result in vast functional differences between the prior art citrus peeling devices and the coring device of this invention. The points on the teeth of the coring device of this invention will readily penetrate soft commodities such as tomatoes. The edges 58 of the citrus peeling devices will penetrate a tomato with great difficulty, and where the tomato is soft, can result in substantial compressing or squeezing of the tomatoes. Once the coring device of this invention has penetrated a tomato it will easily cut the flesh of the tomato around the core. This is because fine cutting edges 40 are provided on the tooth. Contrasted with this, there are not cutting edges whatsoever on the prior art citrus peeling devices. Although flat surfaces 60 can be used for cutting through the flesh of a tomato around the core, a clean cut cannot be obtained. Furthermore, the skin of the tomato will not be cut by the flat surface 60 but will only be ripped or shredded. Contrasted with this, the device of this invention will cleanly cut the skin and the flesh of the tomato leaving a sharply defined hole (FIG. 10).

The structural differences between the coring device of this invention and the prior art citrus peeling devices are the direct result of the methods of manufacture of the two devices. As seen in FIG. 6, and explained in connection therewith, the device of this invention is formed by cutting the teeth 30 in a direction which is parallel to the vertical axis of the dome 28. Contrasted with this, the teeth 56 of the citrus peeling devices are formed by cutting in a direction which is substantially perpendicular to the vertical axis of the dome 54. Thus, as best seen in FIG. 8, in effect, the cutting direction would be in a direction perpendicular to a vertical center line through each tooth 56. This would also be perpendicular to a center line through the dome 54. In actual practice, the citrus peeling devices are formed by a two step process. The first step is to stamp a blank sheet of metal and cut a handle and the domed head 54 and its associated teeth 56. This cutting takes place while the dome and the teeth are in a flat condition. The second step in forming the citrus peeling device is to form the flattened section of the dome into the shape shown in FIGS. 7 and 8.

As pointed out above, the device of this invention is especially useful in solving the problem of easily removing the core of a tomato. However, the device has many other uses in connection with the preparation of fruits and vegetables. For instance, it can be used for removing the crown and core of an onion. It is now the normal practice of commercial food vendors to slice off the top and bottom of an onion. This results in a great deal of wasted food. Utilizing the device of this invention the crown and core of the onion are easily removed without removing any of the desired parts of the onion.

Another use of the device is to remove one end of an orange to permit the juice to be squeezed or sucked from the orange. It can also be used as a melon baller. Because of the sharp teeth in the cutting head of the device, it can be used for making decorative surfaces on various fruits and vegetables. For instance, it can be used to scratch the skin of a cucumber in any desired ornamental design.

Without further elaboration, the foregoing will so fully illustrate my invention, that others may, by applying current or future knowledge, adopt the same for use under various conditions of service.

What is claimed as the invention is:

1. A coring device comprising a handle having a cutting member at one end thereof, said cutting member comprising a concave dome having an edge lying in a plane which is parallel to the plane of said handle, a plurality of spaced teeth projecting from said edge, said teeth being substantially circularly arranged around said edge, each of said teeth terminating in a point, said handle being vertically spaced from said points of said teeth in a direction away from said dome, and each of said teeth having a pair of sides, with each side terminating in a cutting edge, each cutting edge being formed from a bevelled surface on the side of the tooth.

2. The coring device of claim 1 wherein said cutting edges converge and terminate in said point.

3. The coring device of claim 1 wherein the outer surface of each tooth comprises a vertical edge, with said vertical edge terminating in said point.

4. The coring device of claim 1 wherein said handle is reinforced.

5. The coring device of claim 4 wherein the reinforcement for said handle comprises a rib formed in said handle.

References Cited

UNITED STATES PATENTS

| Re. 2,682 | 7/1867 | Grosjean | 30—340 |
| 104,051 | 6/1870 | Milligan | 30—340 |
| 908,894 | 1/1909 | Smiley | 30—149 |
| 1,035,606 | 8/1912 | Kohn | 30—304 X |
| 2,810,957 | 10/1957 | Nelson | 30—324 |
| 2,815,570 | 12/1957 | Engstrom | 30—24 |
| 2,858,605 | 11/1958 | Engstrom | 30—24 |
| 2,993,273 | 7/1961 | Engstrom | 30—24 |

FOREIGN PATENTS 1,004,073  3/1957  Germany.

ROBERT C. RIORDON, Primary Examiner

G. F. GRAFEL, Assistant Examiner